June 20, 1961  R. N. SAMPSON  2,989,657
LAMINATED STRUCTURE HAVING POLYFLUOROETHYLENE
ON ONE SURFACE THEREOF
Filed July 23, 1956

2,989,657
Patented June 20, 1961

1

2,989,657
LAMINATED STRUCTURE HAVING POLYFLUO-ROETHYLENE ON ONE SURFACE THEREOF
Ronald N. Sampson, Pittsburgh, Pa., assignor to Westinghouse Electric Corporation, East Pittsburgh, Pa., a corporation of Pennsylvania
Filed July 23, 1956, Ser. No. 599,422
2 Claims. (Cl. 310—270)

The present invention relates to polyfluoroethylene-surfaced laminated structures and relates particularly to retaining rings adapted for mounting in slip engagement about the coils carried by the rotating member of electrical machines.

In the electrical industry, retaining rings are mounted on the armature, rotor and the like rotating members of motors, generators and the like electrical machines to confine the ends of the insulated coils carried by such rotating members and to maintain the coils in correct alignment.

Generally, a cylindrically-shaped, thick-walled metal ring is used for this purpose to resist the strong centrifugal forces exerted by the rotating member when the machine is in operation. As is well known, when the machine is running the copper in the coils heats up substantially and undergoes expansion. Such expansion is usually in an axial direction. Due to such expansion the ends of the coils, which are confined within the metal retaining ring, move longitudinally and thereby rub and abrade against the internal circumferential surface of the ring. In a relatively short period of time, the coil insulation may become worn and abraded to such an extent that a short circuit may occur between the coil and the retaining ring.

In the past, to avoid such an undesirable result, the internal circumferential surfaces of the retaining rings have been machined carefully to provide the rings with a smooth surface. It has been determined, however, that machining, no matter how carefully done, does not provide a surface of sufficient smoothness to prevent or at least to substantially minimize the problem of coil abrasion whereby an ultimate loss of coil insulation and a resultant short circuit between the coil and the retaining ring can be avoided.

Various experiments have been made to overcome this problem, but with no practically useful results. Thus, resins applied to the metal retaining ring provided surfaces which did bind so that the coil was prevented from slipping or sliding in an axial plane due to heat expansion. This sometimes caused the coil to bow out along the longitudinal extent of the rotating member, forcing the coil retaining wedge out of its slot and disturbing the dynamic balance of the rotor. This, in turn, caused the rotating member to revolve eccentrically and was dangerous to operation.

The surprising discovery has now been made that a smooth surfaced plastic laminated article, more specifically a laminated plastic liner adapted for use in retaining rings for rotors of electrical apparatus, may be made by applying (1) a single sheet of fibrous material having fused polytetrafluoroethylene or polychlorotrifluoroethylene applied to only one side thereof to (2) a laminated core comprising a plurality of sheets of fibrous material, the resultant assemblage being bonded together with a resinous binder into a unitary structure presenting the polytetrafluoroethylene at an outer surface.

The object of the present invention is to provide a laminated plastic member having at least one surface thereof provided with a veneer layer of a polyfluoroethylene.

Another object of this invention is to provide a process for bonding a single sheet of fibrous material having fused polyfluoroethylene on only one side thereof to a laminated core comprising a plurality of superimposed sheets of fibrous material impregnated with a resinous binder.

Still another object of the present invention is to provide a retaining ring adapted for mounting in slip engagement about the coils carried by the rotor of an electrical machine, said ring including a cylindrically shaped laminated plastic liner member comprising (1) a core of laminated fibrous material impregnated with a resin binder and (2) a veneer surface of fused polyfluoroethylene, the whole being bonded into a unitary structure with at least one resinous binder, the polyfluoroethylene being exposed.

Other objects of the invention will in part be obvious and will in part appear hereinafter.

In accordance with the present invention and in the attainment of the foregoing objects, there is provided a retaining ring adapted for mounting in slip engagement about the coils carried by the rotating member of an electrical machine.

More specifically, the retaining ring comprises (1) a cylindrically-shaped housing member and (2) a cylindrically-shaped laminated plastic liner member mounted concentrically within said housing member. The liner member comprises a plurality of superimposed layers of fibrous sheet material bonded into a unitary laminated structure by at least one resinous binder. The free surface of that fibrous sheet of the laminated liner member which is in slip engagement with the coils carried by the rotating member is coated with a quantity of fused polyfluoroethylene such as polytetrafluoroethylene or polychlorotrifluoroethylene.

For a more complete understanding of the present invention, reference is made to the following description taken in conjunction with the accompanying drawing, in which.

Figure 1:
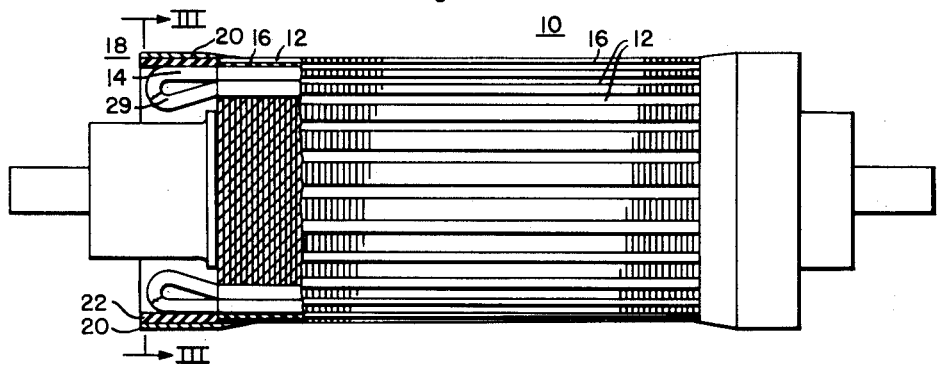
FIGURE 1 is a view in elevation, partly in cross section, illustrating a rotating member of an electrical machine, the current carrying coils mounted on the exterior circumferential surface thereof, and retaining rings produced in accordance with the present invention.

A laminated plastic member such as the liner hereindescribed may be prepared in accordance with this invention by impregnating a plurality of sheets of fibrous material with at least one of several resinous binders which will be described more fully hereinbelow. The resin impregnated sheets of fibrous material then are superimposed upon one another to form a core. To at least one surface of the core there is applied a veneer sheet of fibrous material having, on only the outer surface thereof, a fused layer of polyfluoroethylene. The other surface of the veneer sheet is free from any of the polyfluoroethylene. Thereafter, the resulting assemblage is placed under pressure in the presence of heat whereby the assemblage is formed into a bonded unitary laminated structure.

The fibrous material employed in preparing both the core portion of the member and the veneer layer may be glass cloth, glass paper, glass mat, or the like. Such material may be employed in sheets varying in thicknesses from 1 to 50 mils.

The resinous binder component may comprise any one or more of the many thermosettable resinous materials known to possess characteristics and/or properties which enable them to bond sheets of such fibrous material into a unitary laminated structure. Examples of suitable resinous materials include epoxide resins, melamine resins, phenolic resins, polyester resins and silicone resins, or mixtures of two or more of these resins.

The veneering sheet of polyfluoroethylene may be prepared in any convenient manner. Thus, it may be prepared by spraying a suspensoid of polytetrafluoroethylene on one side only of a sheet of fibrous material such as glass cloth and thereafter fusing said polyetetrafluoroethylene by heating the same to a temperature of 621° F. or higher; by calendering a quantity of viscous polytetrafluoroethylene on one side only of a sheet of fibrous material followed by heating the calendered viscous coating to the fusion temperature, or above, of polytetrafluoroethylene; or in any other convenient manner. There is available on the market market glass cloth having a coating of fused polytetrafluoroethylene applied to one surface thereof. This cloth has been found to be particularly suitable for use in the present invention.

To indicate even more fully the capabilities of the present invention, the following specific examples are set forth to illustrate the preparation of various plastic laminated members.

Example I

To prepare an epoxy laminating resin, 54 parts of sodium hydroxide are dissolved in about 600 parts of water in an open kettle provided with a mechanical stirrer. Then, about 3 mols of bisphenol "A" are added and the resultant mixture is stirred for about 10 minutes at a temperature of about 30° C. Thereafter, approximately 4 mols of epichlorohydrin are added, whereupon the temperature of the resultant mixture increases to about 60° C. to 70° C. due to the heat of reaction. About 42 parts of caustic soda dissolved in about 9 parts of water are then added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which may be added acetic acid in an amount sufficient to neutralize unreacted caustic soda. A liquid resinous epoxy resin is obtained after substantially all the wash water has been removed. About 5% by weight of metaphenylene diamine catalyst then is admixed with the resin.

Glass cloth then is dipped into the hot resin-catalyst mixture and then is based in an over for about one and one-half hours at 80° C. until the resin has advanced to the B stage, i.e., until the resin has become non-tacky and relatively solid. A sheet of glass cloth having a coating of fused polytetrafluoroethylene on only one side thereof also is dipped into the resin-catalyst mixture and baked for one and one-half hours at 80° C. A laminated structure is prepared by superimposing one layer of polytetrafluoroethylene coated glass cloth on top of five superimposed layers of the glass cloth impregnated only with the epoxy resin. The layer of glass cloth coated with the polytetrafluoroethylene is placed on the five layers forming the core of the laminate with the glass side thereof adjacent to the core. The superimposed assemblage is heated for three minutes at 340° F. with no pressure being applied. At the end of this preheat period, pressure of 500 p.s.i. is applied and the assemblage is cured for thirty-five minutes at 340° F. On cooling, the resultant laminate may be cut to size whereupon it is suitable for use as a liner for a retaining ring adapted for mounting on the rotating member of an electrical machine. The epoxy resin on the exposed surface of the polytetrafluoroethylene is readily removed by peeling.

Example II

A phenolic resin is prepared by heating at reflux for about one hour: about 1 mol of phenol (hydroxy benzene), about 1.1 mol of formaldehyde (37%), and about 5% by weight of calcium hydroxide. The resultant mixture then is dehydrated at a pressure of about 15–20 mm. Hg and a temperature of about 110° C. The resultant viscous liquid then is diluted with sufficient ethyl alcohol to provide a resin varnish suitable for impregnation into fibrous material. Glass cloth is dipped into the resin thus prepared and then dried in an oven maintained at 100° C. for one hour. A sheet of glass cloth having fused polytetrafluoroethylene applied to only one side thereof also is dipped into the resin mixture and similarly dried. The dried cloth sheets then are superimposed upon one another as described in Example I, and placed in a press. The impregnated polytetrafluoroethylene cloth is placed on top of the superimposed assemblage with its glass side down. The superimposed assemblage is permitted to preheat for three minutes at 340° F. with no pressure being applied. At the end of this period the press is closed and the assemblage is baked for ten minutes at 340° F. and 2000 p.s.i. On cooling, the resultant laminate may be cut to size and used as a liner for a retaining ring in accordance with this invention.

Example III

A polyester impregnating resin is prepared by reacting about 1 mol of phthalic anhydride, about 1 mol of fumaric acid and about 2.2 mols of propylene glycol at 160° C. for about 3–4 hours followed by heating at 200° C. for about 6–8 hours. The resultant polyester then is blended with monostyrene in the ratio of about two parts ester per each one part of monostyrene. About 0.5% by weight of benzoyl peroxide catalyst then is added and glass cloth then is dipped into the mixture and then partially dried. The sheet is cut into squares, five of which are superimposed upon one another to form a core. On top of the core there is placed a sheet of glass cloth having a coating of fused polychlorotrifluoroethylene applied to only one side thereof. The glass side of the polychlorortifluoroethylene cloth is placed adjacent to the core. This cloth is not dipped in the polyester resin prior to its being placed on the core material. The resultant superimposed assemblage is placed in a suitable press which is closed to stops after which the assemblage is cured at 340° F. for about four minutes. On cooling, the resultant laminated structure is found to be suitable for use as a liner for a retaining ring in accordance with this invention.

Similar suitable laminates may be prepared by employing either melamine resins or silicone resins in addition to or in place of the resins employed in Examples I to III hereinabove with suitable satisfactory results being obtainable.

Referring to the drawing, FIG. 1 illustrates a rotor 10 adapted for use in an electrical machine such as an inner-cooled generator, not shown. Rotor 10 has a plurality of longitudinally extending slots 12 in its exterior surface into which are placed coils 14 which are held in place by wedges 16. A retaining ring 18 is mounted in slip engagement on rotor 10 about the ends of coils 14.

Figure 2:
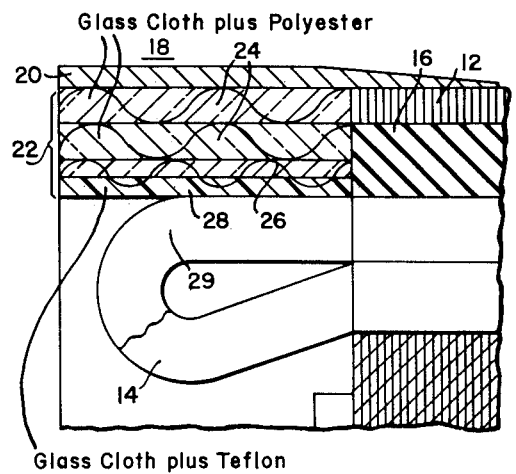
FIG. 2 is a fragmentary view of a portion of the rotating member shown in FIG. 1, enlarged for purposes of clarity in describing the retaining ring of the present invention.

As illustrated more clearly in FIG. 2, ring 18 comprises a cylindrically-shaped housing member 20 of metal and a cylindrically-shaped laminated plastic liner member 22. Liner member 22 comprises a bonded laminated structure having a core comprising a plurality of superimposed resin-impregnated fibrous sheets 24 and a veneer sheet 6 comprising a layer of glass cloth having a fused polyfluoroethylene layer 28 on only the free surface thereof. The assembly 22, comprising the core sheets 24 and venner sheet 26, are bonded into a unitary laminated structure by a suitable thermoset resinous binder as described hereinabove.

When the generator is in operation with rotor 10 revolving, the copper in coils 14 heats up and expands axially with respect to rotor 10. Such axial expansion may occur freely, without undesirable abrasion of insulation 29 from coil 14, since coils 14 slide smoothly against the surface of fused polyfluoroethylene 28 on the free surface of veneer layer 26 of liner 22 of retaining ring 18.

Polytetrafluoroethylene and polychlorotrifluoroethylene are synthetic polymeric materials which are resistant to high temperatures; resistant to abrasion; and possessed of good electrically insulating properties such as high dielectric strength, high insulation resistance, and extremely low dielectric losses. Additionally, they have the desirable property of providing surfaces having unusually low coefficients of friction under heavy loads, so that insulated coils may slide or slip freely thereon without a concurrent abrading off of the coil insulation.

Figure 3:
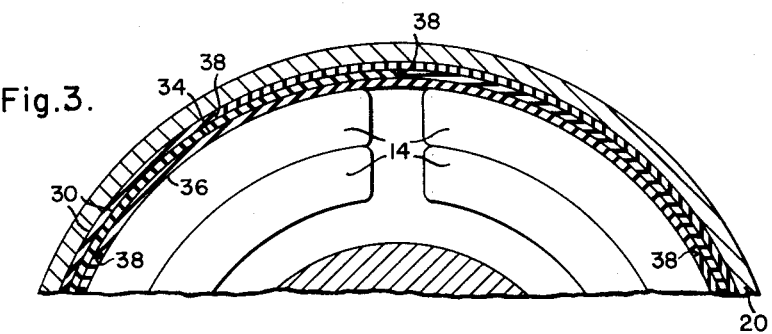
FIG. 3 is an enlarged fragmentary view in cross-section of a portion of the structure shown along line III—III in FIG. 1.

As illustrated in FIG. 3, a plurality of superimposed laminated structures may be employed in forming a liner member. Thus, one or more layers 30 comprising only fibrous material and a thermoset resinous binder may be mounted concentrically within metal housing member 20. Concentrically within layers 30 there then is mounted a single layer 34 having an exposed veneer surface 36 of fused polyfluoroethylene. As illustrated at 50 in FIG. 3, layers 30 and 34 each are composed of sections mounted in abutting relationship with each other. As further illustrated in FIG. 3, the layers 30 and 34 are mounted within housing 20 in such manner whereby the abutting joints 38 are in staggered or non-aligning relationship. This reduces the possibility of electrical short circuits occurring between coils 14 and metal housing 20.

Figure 4:
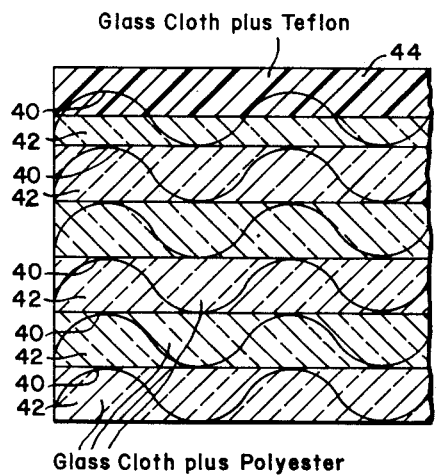
FIG. 4 is a cross-sectional view of a laminated plastic member having a veneer sheet of fused polytetrafluoroethylene applied to one surface thereof.

In FIG. 4 there is illustrated a view in cross-section of a length of a laminated structure prepared in accordance with this invention. The structure illustrated comprises a plurality of layers of glass cloth 40 impregnated with a resin binder 42. A coating of fused polytetrafluoroethylene 44 is on the free or exposed side of the uppermost layer of glass cloth 40. As illustrated on the drawing, the coating 44 of polytetrafluoroethylene penetrates part way between the fibers of cloth 40. The lower side of the cloth is impregnated with polyester resin 42 which bonds all the layers 40 into a unitary structure.

The laminated plastic members of this invention in addition to being formed and shaped for use as liners for retaining rings as herein described also have utility in refrigerators, for example, as liners for the doors and side walls, in ice trays, as chemical resistant liners for chemical tanks and drums, as sink and counter tops, and the like.

While the present invention has been described with respect to what is at present considered to be the preferred embodiment thereof, it will be understood of course that certain changes, substitutions and the like may be made therein without departing from its true scope.

I claim as my invention:

1. A retaining ring mounted in slip engagement about the coils carried by the rotating member of an electrical machine, said ring comprising a cylindrically-shaped housing member and a cylindrically-shaped laminated plastic liner member, said liner member being mounted concentrically within said housing member and comprising a plurality of superimposed layers of fibrous sheet material bonded into a unitary laminated structure by at least one thermoset resinous binder, the free surface of that fibrous sheet of the laminated liner member which is in slip engagement with the coils being coated with polyfluoroethylene.

2. A retaining ring mounted in slip engagement about the coils carried by the rotating member of an electrical machine, said ring comprising a cylindrically-shaped housing member and a cylindrically-shaped laminated plastic liner member, said liner member being mounted concentrically within said housing member and comprising a plurality of superimposed layers of fibrous sheet material bonded into a unitary laminated structure by at least one thermoset resinous binder selected from the group consisting of epoxy, melamine, phenolic, polyester, and silicone resins, the free surface of that fibrous sheet of the laminated liner member which is in slip engagement with the coils being coated with polyfluoroethylene.

References Cited in the file of this patent

UNITED STATES PATENTS

| | | |
|---|---|---|
| 920,846 | Erben | May 4, 1909 |
| 932,042 | Mattman | Aug. 24, 1909 |
| 1,454,845 | Clay | May 15, 1923 |
| 1,597,539 | Novotny et al. | Aug. 24, 1926 |
| 1,697,182 | Hall | Jan. 1, 1929 |
| 1,769,063 | Kimman | July 1, 1930 |
| 2,084,081 | Faber | June 15, 1937 |
| 2,392,388 | Joyce | Jan. 8, 1946 |
| 2,444,059 | Neher et al. | June 29, 1948 |
| 2,454,625 | Bondon | Nov. 23, 1948 |
| 2,464,826 | Neher et al. | Mar. 22, 1949 |
| 2,531,007 | Strom | Nov. 21, 1950 |
| 2,625,499 | Nebesar | Jan. 13, 1953 |
| 2,686,738 | Teeters | Aug. 17, 1954 |
| 2,701,317 | Herman | Feb. 1, 1955 |
| 2,749,460 | Acton et al. | June 5, 1956 |
| 2,768,925 | Fay | Oct. 30, 1956 |
| 2,801,198 | Morris et al. | July 30, 1957 |
| 2,810,674 | Madden | Oct. 22, 1957 |
| 2,828,236 | West | Mar. 25, 1958 |
| 2,844,746 | Coggeshall | July 22, 1958 |